United States Patent
Yu et al.

(10) Patent No.: US 8,026,766 B2
(45) Date of Patent: Sep. 27, 2011

(54) POWER CIRCUITS FOR POWER AMPLIFIERS AND COMMUNICATION SYSTEMS USING THE SAME

(75) Inventors: Long-Kun Yu, Taipei County (TW); Wen-Wei Yang, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 43 days.

(21) Appl. No.: 12/413,927

(22) Filed: Mar. 30, 2009

(65) Prior Publication Data

US 2010/0244957 A1 Sep. 30, 2010

(51) Int. Cl.
 *H03F 1/00* (2006.01)
(52) U.S. Cl. ........................... 330/199; 330/297
(58) Field of Classification Search .................. 330/127, 330/199, 296–298
 See application file for complete search history.

(56) References Cited

U.S. PATENT DOCUMENTS

| | | | |
|---|---|---|---|
| 5,757,231 A * | 5/1998 | Tozawa | 330/151 |
| 6,150,800 A | 11/2000 | Kinoshita et al. | |
| 6,975,172 B2 * | 12/2005 | Craynon et al. | 330/297 |
| 7,289,778 B2 | 10/2007 | Sasaki | |

* cited by examiner

*Primary Examiner* — Robert Pascal
*Assistant Examiner* — Khiem Nguyen
(74) *Attorney, Agent, or Firm* — Thomas|Kayden

(57) ABSTRACT

A power circuit for a power amplifier which operates in an inactive period and an active period is provided and includes a power supply unit, a current limiting unit, a storage unit, and a converting unit. The power supply unit provides a first current. The current limiting unit is arranged to process the first current to generate a second current. The storage unit is arranged to provide a storage voltage. The storage unit is charged by the second current during the inactive period and discharged by a third current during the active period. The converting unit provides an active power to the power amplifier according to the storage voltage, the second current, and the third current during the active period.

12 Claims, 4 Drawing Sheets

POWER CIRCUITS FOR POWER AMPLIFIERS AND COMMUNICATION SYSTEMS USING THE SAME

BACKGROUND OF THE INVENTION

1. Field of the Invention

The invention relates to a power circuit for a power amplifier, and more particularly to a power circuit for a power amplifier applied in a communication system.

2. Description of the Related Art

In current communication systems, before a transmission signal is broadcasted through an antenna, the power of the transmission signal has to be amplified by a power amplifier. Among elements of a communication system, a power amplifier consumes a great amount of current from a system power supply when the power amplifier is active. Thus, in such cases, remaining current may not be sufficient for other elements to operate. In efforts to provide sufficient power for all elements to operate when a power amplifier is activated, a communication system requires a system power supply that provides a large amount of total current.

However, for some applications, the total amount of current provided by a system power supply is limited. For example a USB dongle device is limited to a specific power specification of 500 mA (2.5 W). Thus, it is desired to provide a low current power circuit to drive a power amplifier in a low powered device.

BRIEF SUMMARY OF THE INVENTION

An exemplary embodiment of a power circuit for a power amplifier which operates in an inactive period and an active period comprises a power supply unit, a current limiting unit, a storage unit, and a converting unit. The power supply unit provides a first current. The current limiting unit is arranged to process the first current to generate a second current. The storage unit is arranged to provide a storage voltage. The storage unit is charged by the second current during the inactive period and discharged by a third current during the active period. The converting unit provides an active power or a stabilized voltage source to the power amplifier according to the storage voltage, the second current, and the third current during the active period.

An exemplary embodiment of a communication system comprises a power amplifier and a power circuit. The power amplifier operates in an inactive period and an active period. The power amplifier is arranged to receive a transmission signal and amplify a power of the transmission signal. The power circuit is arranged to provide an active power to the power amplifier during the active period. The power circuit comprises a power supply unit, a current limiting unit, a storage unit, and a converting unit. The power supply unit is used to provide a first current. The current limiting unit is arranged to process the first current to generate a second current. The storage unit provides a storage voltage. The storage unit is charged by the second current during the inactive period and discharged by a third current during the active period. The converting unit is arranged to provide the active power to the power amplifier according to the storage voltage, the second current, and the third current during the active period.

An exemplary embodiment of a method for providing power to a power amplifier which operates in an inactive period and an active period is provided. The method comprises the steps of: providing a first current by a system power supply unit; limiting a value of the first current to generate a second current; providing a storage voltage by charging a storage unit by the second current during the inactive period and discharging the storage unit by a third current during the active period; and providing an active power to the power amplifier according to the storage voltage, the second current, and the third current during the active period.

In some embodiments, the step of providing the active power comprises the step of: converting the storage voltage to a fixed driving voltage; providing the second current and the third current to generate a driving current with a first level during the active period; and generating the active power according to the fixed driving voltage and the driving current with the first level during the active period. During the inactive period, the driving current is changed to a second level from the first level, and the second level is lower than the first level.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
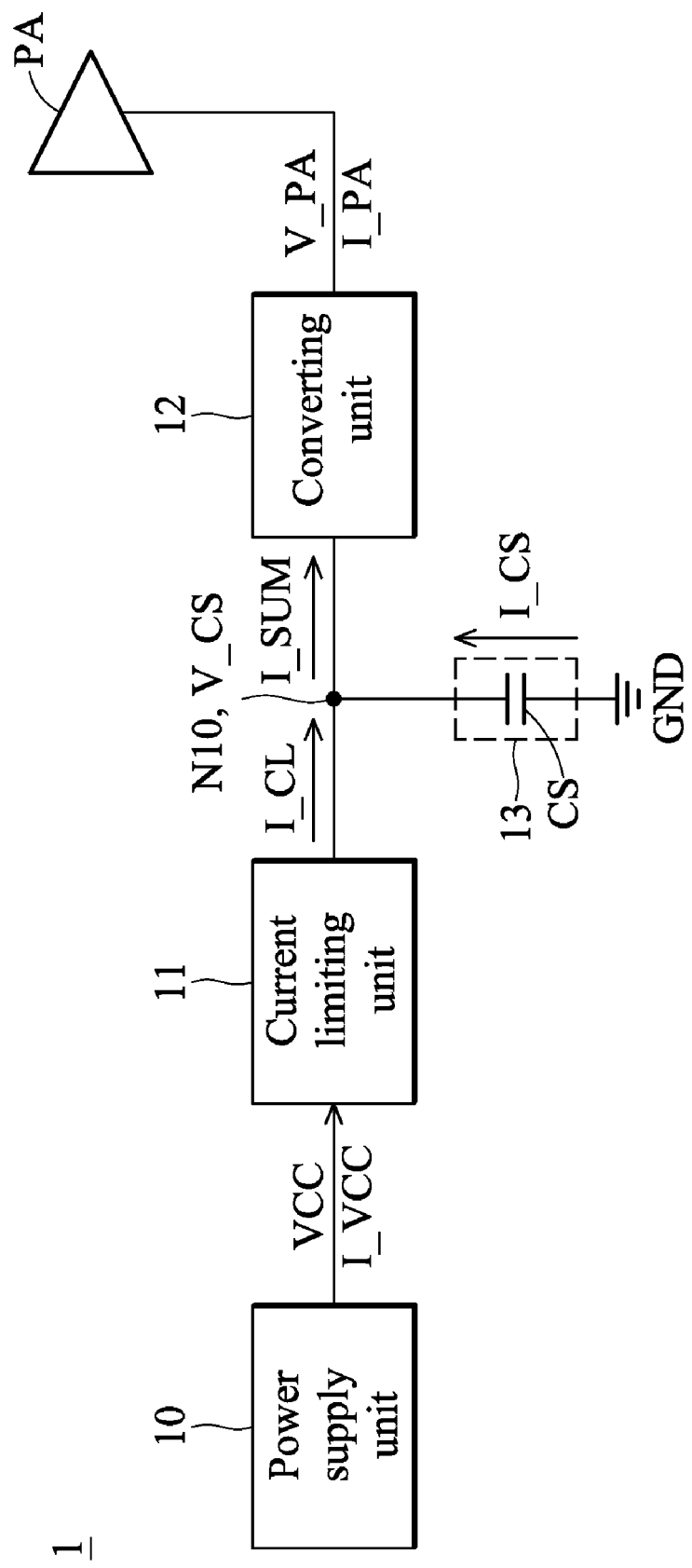
FIG. 1 shows an exemplary embodiment of a power circuit.

Power circuits are provided. In an exemplary embodiment of a power circuit in FIG. 1, a power circuit 1 is used to provide power to a power amplifier PA which operates in an inactive period and an active period. Referring to FIG. 1, the power circuit 1 comprises a power supply unit 10, a current limiting unit 11, a converting unit 12, and a storage unit 13. The power supply unit 10 provides a current I_VCC and a fixed voltage VCC. The current limiting unit 11 receives the current I_VCC and the voltage VCC. The current limiting unit 11 performs a limitation process to the current I_VCC, so that the value of the current I_VCC does not exceed a limit value, and a current I_CL is accordingly generated. As shown in FIG. 1, the storage unit 13 comprises a capacitor CS, and the capacitor CS is coupled between a ground terminal GND and a node N10 which is coupled between the current limiting unit 11 and the converting unit 12. Thus, the storage unit 13 provides a storage voltage V_CS at the node N10 according to charge and discharge operations to the capacitor CS of the storage unit 13. The converting unit 12 converts the storage voltage V_CS to a fixed driving voltage V_PA, which is a stabilized voltage source, and generates a driving current I_PA. In addition, the fixing driving voltage V_PA may be a predetermined design value for the power amplifier PA. The fixed driving voltage V_PA and the driving current I_PA are provided from the converting unit 12 to the power amplifier PA. Accordingly, the power provided to the power amplifier PA from the converting unit 12 is determined by the driving voltage V_PA with a fixed value and the driving current I_PA. In detail, since the driving voltage V_PA has a fixed value, the power provided to the power amplifier PA changes with the variation of the level of the driving current I_PA.

Figure 2:
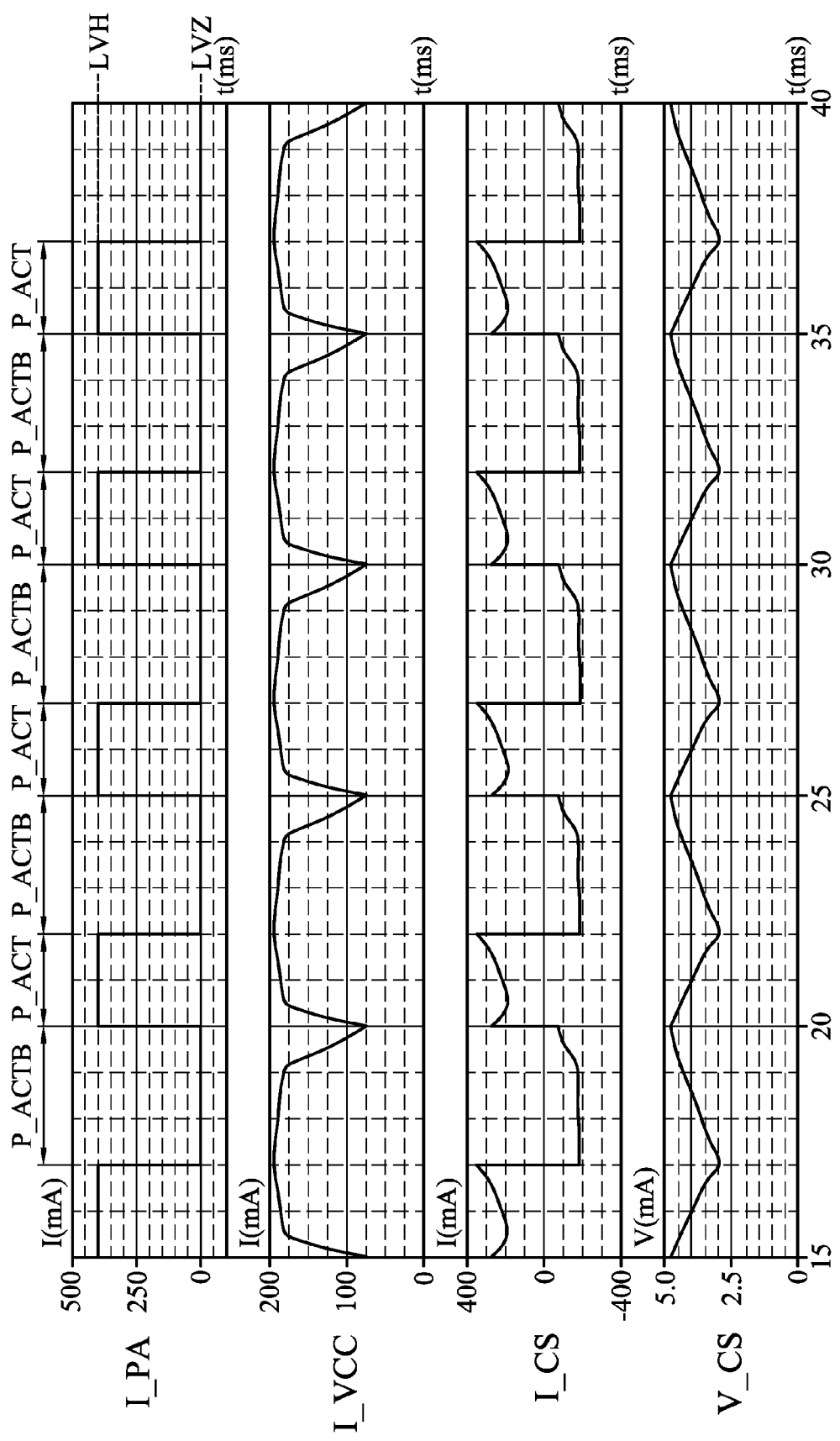
FIG. 2 shows current signals and voltage signals in the power circuit of FIG. 1.

Because the power amplifier PA alternately operates between the active period and the inactive period, the driving current I_PA, required for the power amplifier PA, changes between a high driving current level and a zero driving current level when the active period and the inactive period are switched. Referring to FIG. 2, when the power amplifier PA operates, the driving current I_PA is at a high level LVH during the active period P_ACT, while the driving current I_PA is at a zero level LVZ when the power amplifier PA operates during the inactive period P_ACTB.

When the power amplifier PA operates during the inactive period P_ACTB, since the driving current I_PA provided by the converting unit 12 is at the zero level LVZ, that is the power provided from the converting unit 12 to the power amplifier PA is equal to zero, the converting unit 12 does not require the current I_CL to be provided to the converting unit 12. Referring to FIG. 2, during the inactive period P_ACTB, the current I_CL is provided to the storage unit 13. The capacitor CS of the storage unit 13 is charged by the current I_CL, and thus, the storage voltage V_CS is gradually increased.

When the power amplifier PA operates during the active period P_ACT, since the converting unit 12 has to generate the driving current I_PA with the high level LVH, that is, the converting unit 12 provides non-zero power to the power amplifier PA, the converting unit 12 requires the current to be input. During the active period, the current I_CL is provided to the converting unit 12, and the capacitor CS is discharged with a current I_CS. Referring to FIG. 2, the current I_CS is increased during the active period P_ACT, and the storage voltage V_CS gradually decreased. Thus, a current I_SUM obtained by adding the current I_CL and the current I_CS is provided to the converting unit 12. The converting unit 12 provides the driving voltage V_PA and the driving current I_PA with the high level LVH to the power amplifier PA. That is, the converting unit 12 provides the active power, which is obtained according to the driving voltage V_PA and the driving current I_PA with the high level LVH, to the power amplifier PA.

According to above embodiment, during the active period, since the current provided to the converting unit 12 is obtained by the current I_CL from the current limiting unit 11 and the current I_CS which is generated by discharging of the storage unit 13, the peak value of the current I_VCC from the power supply unit 10 can be reduced. Thus, when the power circuit 1 is applied to a power amplifier in a low powered device with low current supply capabilities, even if the power supply unit 10 of the power circuit 1 provides low total current, the provided current is sufficient for the power amplifier and other elements within the low powered device to operate.

In some embodiments, the power supply unit 10 can be implemented by a low current supply source, such as a USB power source or a battery. Moreover, the converting unit 12 can be implemented by a DC-DC converter or a buck-boost converter. Please note that the present invention utilize the converting unit 12, such as DC-DC converter or a buck-boost converter with a small capacitor, such as 100 uF, 220 uF, or others depended on the PA current consumption and duty-cycle, to maintain the output voltage on an acceptable voltage without utilizing a storage unit required a large capacitance. It should be appreciated that the present invention provides a communication system with a combination of current limiting unit, a small capacitance storage device, and a converting unit to maintain the stability of power-control for overall communication system. Taking any element of a current limiting unit, a small capacitance storage device, and a converting unit away from the communication system will reduce the performance dramatically or increase the system complexity.

Figure 3:
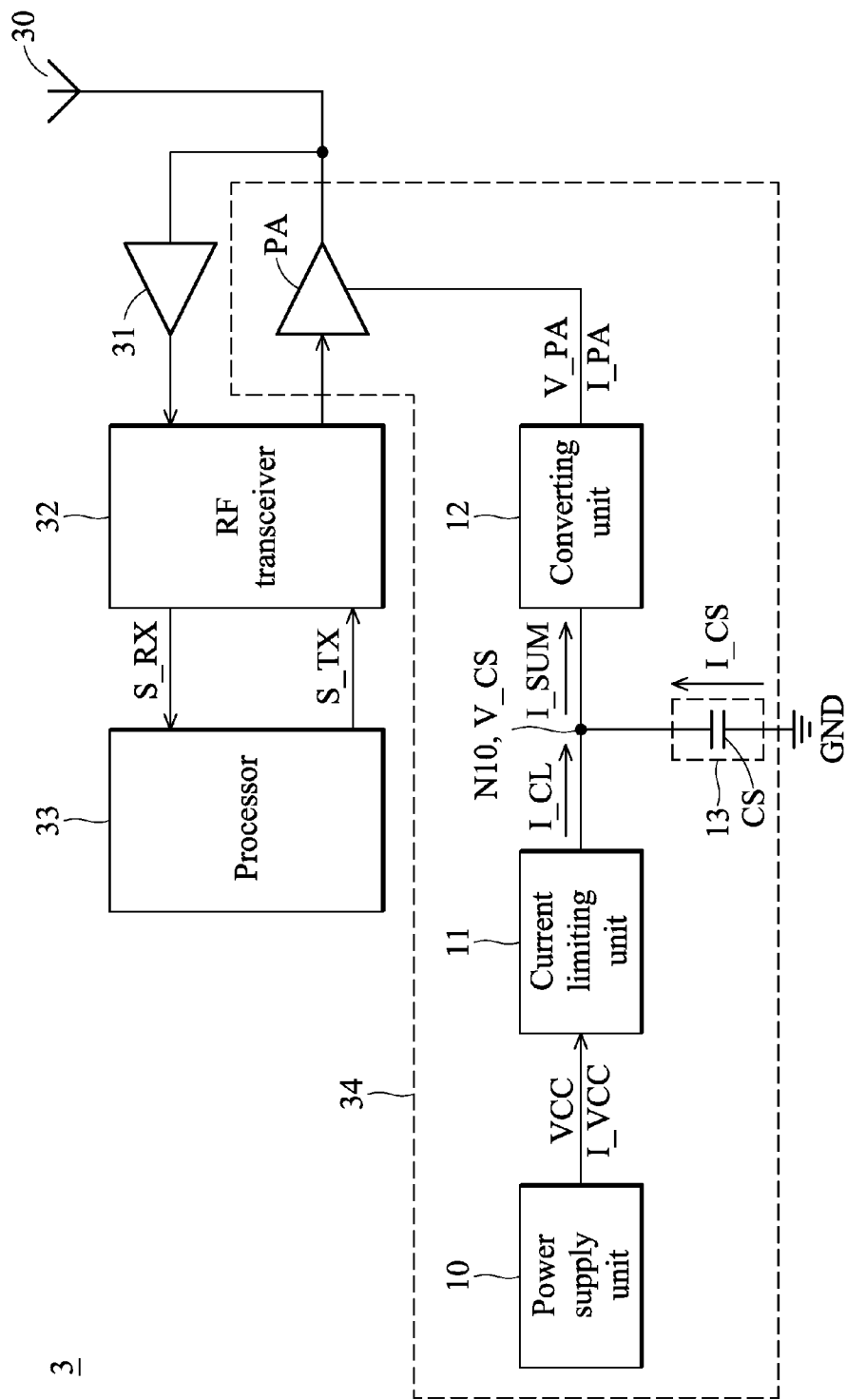
FIG. 3 shows an exemplary embodiment of a communication system using the power circuit of FIG. 1.

The power circuit 1 of FIG. 1 can be applied in a communication system. Referring to FIG. 3, a communication system 3 comprises an antenna 30, a low noise amplifier 31, a radio frequency (RF) transceiver 32, a processor 33 (such as a baseband processor), and a power amplifier PA. The communication system 3 further comprises a power circuit 34 which comprises the same elements and performs the same operations to provide power to the power amplifier PA as the power circuit 1 of FIG. 1. In the power circuits 34 and 1, the same elements are labeled with the same reference numbers and performs the same operations, thus, the operations of the power circuit 34 which are the same as power circuit 1 are omitted.

The communication system 3 receives a signal through the antenna 30. The received signal is amplified by the low noise amplifier 31 and provided to the RF transceiver 32. The RF transceiver 32 processes a radio frequency component of the received signal to generate a receipt signal S_RX. The receipt signal S_RX is then provided to the processor 33 for subsequent signal processes. The processor 33 may provide a transmission signal S_TX to the RF transceiver 32. The RF transceiver 32 processes a radio frequency component of the transmission signal S_TX and provides the processed transmission signal S_TX to the power amplifier PA. The power amplifier PA then amplifies the power of the transmission signal S_TX according to the power provided by the power circuit 1. The transmission signal S_TX with the amplified power is then broadcasted through the antenna 30.

Accordingly, since the storage unit 13 is charged by the current I_CL during the in-active period and the current I_SUM obtained by adding the current I_CL and the current I_CS is provided to the converting unit 12 for the power amplifier PA during the active period, the current I_VCC provided by the power supply unit 10 is sufficient for the power amplifier PA and other elements within the communication system 3, even if the provided current I_VCC is low.

Figure 4:
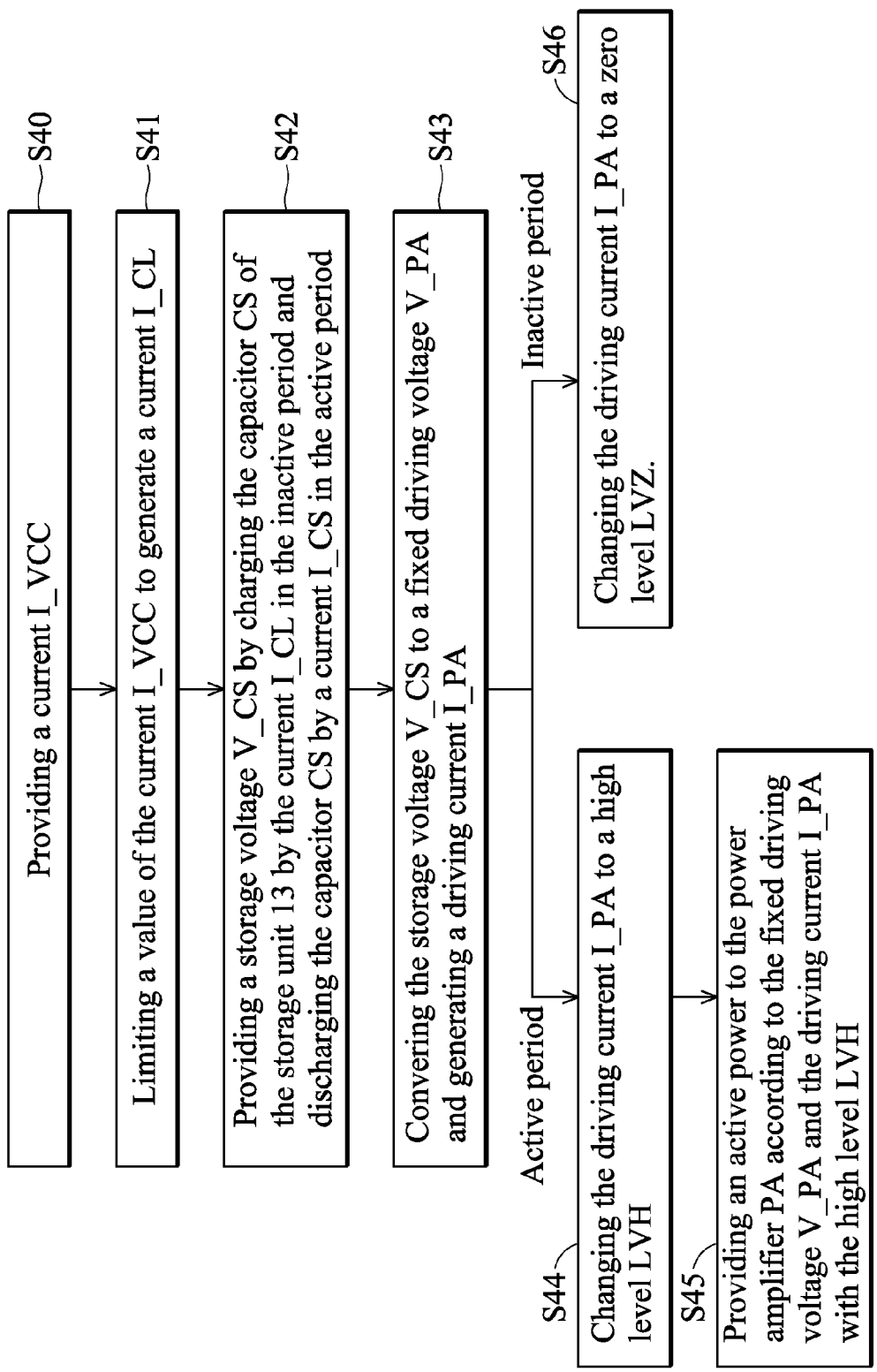
FIG. 4 is a flow chart of an exemplary embodiment of a method for providing power to a power amplifier.

FIG. 4 is a flow chart of an exemplary embodiment of a method for providing power to a power amplifier. The following embodiment will be described according to FIGS. 1, 2, and 4. The power amplifier PA operates in an inactive period and an active period. First, the power supply unit 10 provides a current I_VCC (step S40). The current limiting unit 11 limits a value of the current I_VCC to generate a current I_CL (step S41). By charging the capacitor CS of the storage unit 13 by the current I_CL during the inactive period and discharging the capacitor CS by a current I_CS during the active period, a storage voltage V_CS is provided (step S42). Then, the converting unit 12 converts the storage voltage V_CS to a fixed driving voltage V_PA and generates a driving current I_PA (step S43). When the power amplifier PA operates during the active period, the driving current I_PA is changed to a high level LVH (step S44). The converting unit 12 provides an active power to the power amplifier PA according to the fixed driving voltage V_PA and the driving current I_PA with the high level LVH (step S45). When the power amplifier PA operates during the inactive period, the driving current I_PA is changed to a zero level LVZ from the high level LVH (step S46).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power circuit for a power amplifier operating during an inactive period and an active period, comprising:
   a power supply unit for providing a first current;
   a current limiting unit for processing the first current to generate a second current;
   a storage unit for providing a storage voltage, wherein the storage unit is charged by the second current during the inactive period and discharged by a third current during the active period; and
   a converting unit providing an active power to the power amplifier according to the storage voltage, the second current, and the third current during the active period, wherein the converting unit converts the storage voltage to a fixed driving voltage and further receives the second current and the third current to generate a driving current with a first level during the active period and provides the active power according to the fixed driving voltage and the driving current with the first driving current level to the power amplifier.

2. The power circuit as claimed in claim 1, wherein the driving current changes to a second level from first level during the inactive period, and the second level is lower than the first level.

3. The power circuit as claimed in claim 1, wherein the storage unit comprises a capacitor coupled between a ground terminal and a first node which is coupled between the current limiting unit and the converting unit and provides the storage voltage at the first node.

4. The power circuit as claimed in claim 1, wherein the power supply unit is implemented by a low current supply source.

5. The power circuit as claimed in claim 4, wherein the low current supply source is a USB power source or a battery.

6. A communication system comprising:
   a transceiver for receiving a transmission signal, processing a radio frequency component of the transmission signal, and providing the processed transmission signal;
   a power amplifier, operating during an inactive period and an active period, for receiving the processed transmission signal and amplifying a power of the processed transmission signal; and
   a power circuit, for providing an active power to the power amplifier during the active period, comprising:
      a power supply unit for providing a first current;
      a current limiting unit for processing the first current to generate a second current;
      a storage unit for providing a storage voltage, wherein the storage unit is charged by the second current during the inactive period and discharged by a third current during the active period; and
      a converting unit for providing the active power to the power amplifier according to the storage voltage, the second current, and the third current during the active period.

7. The communication system as claimed in claim 6, wherein the converting unit converts the storage voltage to a fixed driving voltage, receives the second current and the third current to generate a driving current with a first level during the active period, and provides the active power according to the fixed driving voltage and the driving current with the first driving current level to the power amplifier.

8. The communication system as claimed in claim 7, wherein the driving current changes to a second level from first level during the inactive period, and the second level is lower than the first level.

9. The communication system as claimed in claim 6, wherein the storage unit comprises a capacitor coupled between a ground terminal and a first node which is coupled between the current limiting unit and the converting unit and provides the storage voltage at the first node.

10. The communication system as claimed in claim 6, wherein the power supply unit is implemented by a low current supply source.

11. The communication system as claimed in claim 10, wherein the low current supply source is a USB power source or a battery.

12. The communication system as claimed in claim 6, wherein the converting unit is implemented by a DC-DC converter or a buck-boost converter.

* * * * *